US008276181B1

(12) United States Patent
Altchek

(10) Patent No.: US 8,276,181 B1
(45) Date of Patent: Sep. 25, 2012

(54) CONTENT DISTRIBUTION SYSTEM AND METHOD FOR OPTIMIZING MULTIPLEXED TRANSPORT CHANNELS

(75) Inventor: Glenn Altchek, Lawrenceville, NJ (US)

(73) Assignee: General Instrument Corporation, Horsham, PA (US)

( * ) Notice: Subject to any disclaimer, the term of this patent is extended or adjusted under 35 U.S.C. 154(b) by 1312 days.

(21) Appl. No.: 11/963,012

(22) Filed: Dec. 21, 2007

(51) Int. Cl.
*H04N 7/173* (2011.01)

(52) U.S. Cl. .......................................... 725/96; 725/97

(58) Field of Classification Search .................. None
See application file for complete search history.

(56) References Cited

U.S. PATENT DOCUMENTS

| | | | | |
|---|---|---|---|---|
| 6,005,561 | A * | 12/1999 | Hawkins et al. | 715/234 |
| 6,016,141 | A * | 1/2000 | Knudson et al. | 715/721 |
| 6,163,316 | A * | 12/2000 | Killian | 715/721 |
| 6,665,872 | B1 * | 12/2003 | Krishnamurthy et al. | 725/95 |
| 6,857,132 | B1 * | 2/2005 | Rakib et al. | 725/114 |
| 7,068,724 | B1 * | 6/2006 | Hamilton | 375/240.26 |
| 7,096,486 | B1 * | 8/2006 | Ukai et al. | 725/58 |
| 7,150,030 | B1 * | 12/2006 | Eldering et al. | 725/46 |
| 7,185,353 | B2 * | 2/2007 | Schlack | 725/35 |
| 7,454,337 | B1 * | 11/2008 | Smith et al. | 704/240 |
| 7,463,616 | B1 * | 12/2008 | Earnshaw et al. | 370/347 |
| 7,649,849 | B2 * | 1/2010 | Mallya | 370/252 |
| 7,792,152 | B1 * | 9/2010 | Xu et al. | 370/503 |
| 7,983,927 | B2 * | 7/2011 | McGill et al. | 705/1.1 |
| 2002/0047899 | A1 * | 4/2002 | Son et al. | 348/114 |
| 2002/0056124 | A1 * | 5/2002 | Hay | 725/87 |
| 2004/0045030 | A1 * | 3/2004 | Reynolds et al. | 725/110 |
| 2006/0130113 | A1 * | 6/2006 | Carlucci et al. | 725/118 |
| 2006/0253864 | A1 * | 11/2006 | Easty | 725/35 |
| 2007/0055986 | A1 * | 3/2007 | Gilley et al. | 725/34 |
| 2009/0070838 | A1 * | 3/2009 | Pham et al. | 725/105 |
| 2009/0083817 | A1 * | 3/2009 | Van Den Hoven et al. | 725/116 |

* cited by examiner

Primary Examiner — Brian Pendleton
Assistant Examiner — Jonathan V Lewis
(74) Attorney, Agent, or Firm — Lori Anne D. Swanson

(57) ABSTRACT

A content distribution system includes a distribution center, a processor, a switch, and first and second multiplexers. The distribution center receives and applies program content on program channels. The processor identifies subsets of the program channels in response to a respective score associated with the program channels. The switch couples the distribution center to the multiplexers. The switch applies program channels to respective inputs of the first and second multiplexers in response to the processor. A method for optimizing a multiplexed transport channel includes the steps of identifying a set of program channels designated for distribution via the multiplexed transport channel, arranging the set of program channels in subsets, the program channels within a subset grouped in accordance with a viewing score, multiplexing the program channels of the subsets to a respective transport channel and applying the respective transport channels to a distribution medium for delivery to the destination.

9 Claims, 6 Drawing Sheets

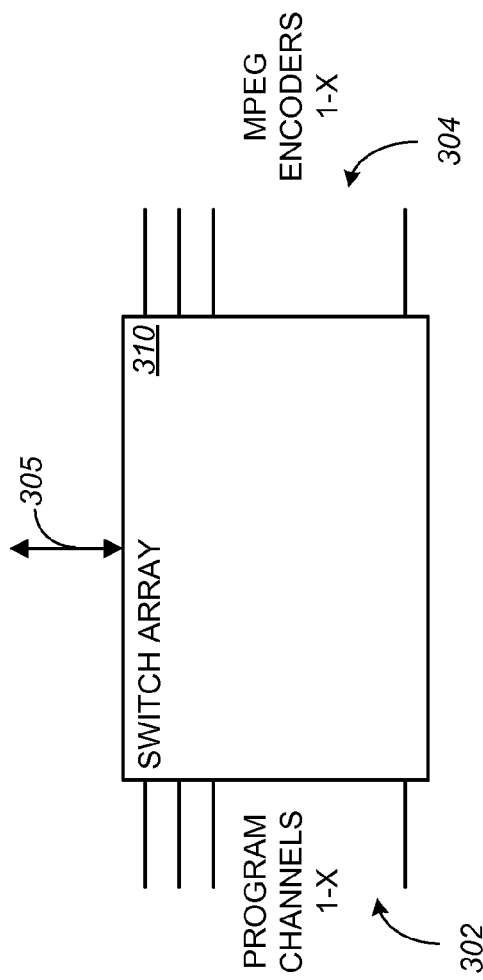
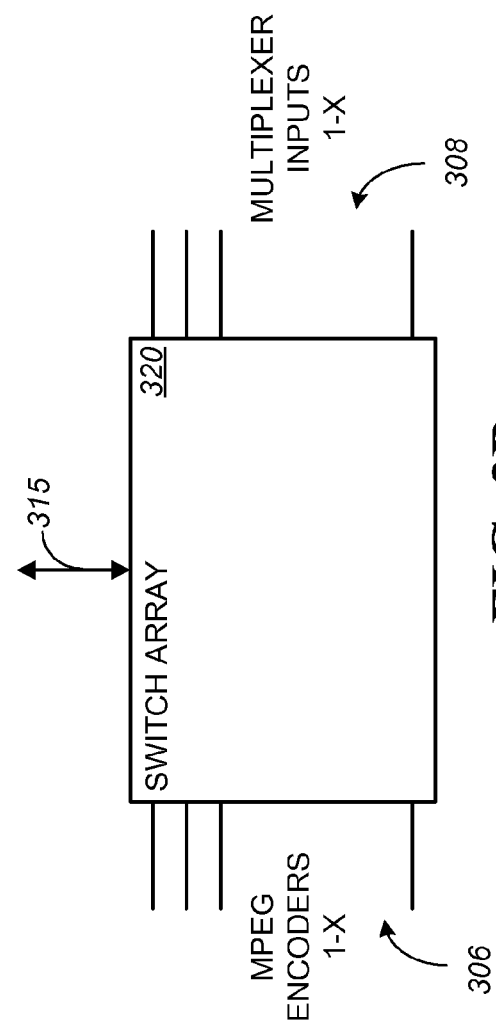
FIG. 3A
FIG. 3B

CONTENT DISTRIBUTION SYSTEM AND METHOD FOR OPTIMIZING MULTIPLEXED TRANSPORT CHANNELS

BACKGROUND OF THE INVENTION

1. Field of the Invention

The invention relates generally to the field of multimedia distribution systems. More particularly, this disclosure relates to a multimedia processing system and method for intelligently optimizing multimedia transport channels.

2. Description of the Related Art

Multimedia service providers use communication systems that deliver multiple program channels to subscribers of the respective service. Program channels include content from local television and radio stations, national and regional networks, governments, movie providers and advertisers, among others. Program content is limited only by the imagination of the creator(s). Community antenna television (CATV) and satellite service providers generally offer packaged services, which include a set of program channels that are provided in return for a subscription fee.

Prior art systems for distributing multiple program channels to subscribers use a combination of signal processors, multiplexers and modulators to deliver multiple program channels in a transport channel. A prior art system for broadcasting multimedia signals is illustrated in FIG. 1. The system receives program channel 1 through program channel 108 that are inserted into corresponding MPEG encoders, multiplexers and modulators to generate a transport channel that includes the encoded program information from a subset of the various channels.

In the illustrated embodiment, program 1 is applied to MPEG encoder 11, multiplexer 21 and modulator 31 to provide the first of eight program channels in transport channel 41. Similarly, program 2 is applied to MPEG encoder 12, multiplexer 21 and modulator 31 to provide a second of eight program channels in transport channel 41. Lastly, program 8 is applied to MPEG encoder 18, multiplexer 21 and modulator 31 to provide the eighth of eight program channels in transport channel 41. In addition, program 101 is applied to MPEG encoder 61, multiplexer 71 and modulator 81 to provide the first of eight program channels in transport channel 91. Similarly, program 102 is applied to MPEG encoder 62, multiplexer 71 and modulator 81 to provide a second of eight program channels in transport channel 91. Lastly, program 108 is applied to MPEG encoder 68, multiplexer 71 and modulator 81 to provide the eighth of eight program channels in transport channel 91. Transport channel 91 is carried in a different portion of the RF spectrum than that used to carry transport channel 41.

Using MPEG compression, CATV systems installed today can transmit up to 10 channels of video in the 6 MHz bandwidth of a single analog transport channel. When combined with a 550 MHz overall bandwidth, this allows the possibility of nearly 1,000 program channels on a system.

Each of the prior art program channels is arranged in a transport channel in a numerical sequence in accordance with its assigned slot in a channel lineup. As further illustrated in FIG. 1, program 1 has a 22% likelihood of being tuned or viewed by a subscriber, program 2 has a 1% likelihood of being tuned or viewed by a subscriber and program 8 has a 1% likelihood of being tuned or viewed by a subscriber. Thus, transport channel 41 is carrying at least three program channels with different likelihoods of being tuned or viewed by a subscriber to the service. More importantly, program 102 has an 18% likelihood of being tuned or viewed, program 108 has a 12% likelihood of being tuned or viewed and program 101 has a 3% likelihood of being tuned or viewed. Thus, there is a higher likelihood that a subscriber will select a tuning operation that will require a local tuner to acquire a carrier signal from a different transport channel due to known or predicated viewing habits.

Satellite distribution services include direct broadcast to the viewer, broadcast to local television affiliates for radio-frequency distribution, or broadcast to CATV head ends for distribution across the above-described terrestrial CATV systems. Regardless of the satellite configuration, an uplink signal containing multiplexed program channels is broadcast from a ground station in one portion of the RF spectrum where it is received by a satellite and re-broadcast via a downlink signal in another portion of the RF spectrum.

Subscribers of CATV and satellite services use one or more tuners configured to lock on to the carrier frequency of the transport channel 50 and down-convert the signals to baseband signals. Appropriately configured demodulators demodulate the baseband signals to extract the underlying program content. The multimedia signal demodulated by the demodulators contains a plurality of multiplexed multimedia streams, each containing the program content from a single cable or satellite "channel" (e.g., HBO).

Subscribers experience a delay as they select or tune program channels. The delays are due to multiple factors including tuning time between multiplexed transport channels, demodulation processing, MPEG decoding and in some cases decryption processing of encrypted content.

The placement of program content on a select program channel is generally dictated by service providers and in some cases by content providers with a desire to be located in a specific range of the channel lineup. Some service providers group premium channels in a first range of the channel lineup and content specific program channels such as channels that provide sports programming in another range of the channel lineup.

A subscriber's experience can be adversely affected by such logically arranged channel lineups. For example, a family of viewers that subscribe to a multimedia service may include viewers with disparate but predictable viewing habits. Children may frequently watch offerings from a select group of program content providers that are transported via a first multiplex of program channels. One or more adults in the home may frequently watch offerings from a number of other program content providers that are transported via additional multiplexes of program channels. For these subscribers, the time it takes their tuner to move to a new carrier signal and acquire a select program channel (i.e., the channel change time) when the subscriber's tuner is presently tuned to a carrier signal that delivers a first multiplex of program channels and the subscriber selects a "new" channel that is provided by a different carrier signal that includes a second multiplex of program channels will be longer than if the program channels were delivered via the same multiplex.

Accordingly, it would be desirable to develop systems and methods that overcome these shortcomings in the random or logical arrangement of program channels in a channel lineup.

SUMMARY

Systems and methods that selectively arrange a set of program channels into a multiplexed transport channel are invented and disclosed. An embodiment of a content distribution system includes a distribution center, a head-end processor, a switch, and first and second multiplexers. The distribution center receives and applies program content on program channels. The head-end processor identifies subsets of the program channels in response to a respective score associated with the program channels. The switch couples the distribution center to the multiplexers. The switch applies program channels to respective inputs of the first and second multiplexers in response to the processor in accordance with the respective scores.

An embodiment of a method for optimizing a multiplexed transport channel includes the steps of identifying a set of program channels designated for distribution via the multiplexed transport channel, arranging the set of program channels in subsets, the program channels within a subset grouped in accordance with a viewing score, multiplexing the program channels of the subsets to a respective transport channel and applying the respective transport channels to a distribution medium for delivery to the destination.

Other devices, methods, features and advantages will be or will become apparent to one skilled in the art upon examination of the following figures and detailed description. All such additional devices, methods, features and advantages are defined and protected by the accompanying claims.

BRIEF DESCRIPTION OF THE DRAWINGS

The present systems and methods for optimizing a multiplexed transport channel, as defined in the claims, can be better understood with reference to the following drawings. The components within the drawings are not necessarily to scale relative to each other; emphasis instead is placed upon clearly illustrating the elements, features and principles involved in selectively arranging program channels in a multiplexed transport channel to reduce the likelihood that a tuning operation will require the acquisition of a carrier in a different multiplexed transport channel.

FIGS. 3A and 3B are schematic diagrams illustrating embodiments of switch arrays inserted in the signal processing paths of FIG. 1.

DETAILED DESCRIPTION

Figure 1:
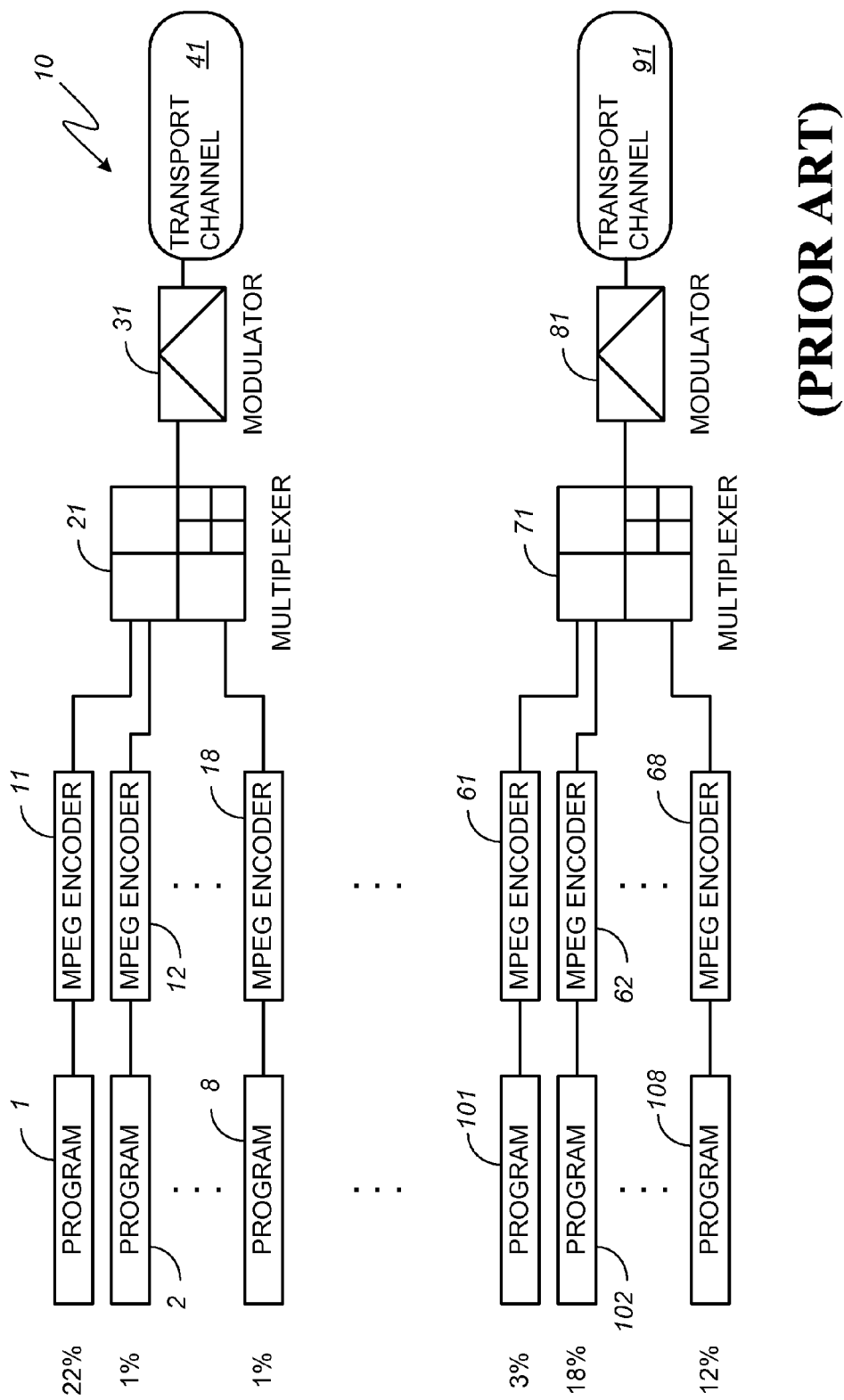
FIG. 1 is a schematic diagram illustrating the insertion of program channels into multiplexed transport channels.

In the following description, like reference numerals indicate like components to enhance the understanding of the systems, devices and methods for optimizing multiplexed transport channels through the detailed description of the illustrated embodiments. Although specific features, configurations and arrangements are discussed herein below, it should be understood that such specificity is for illustrative purposes only. A person skilled in the relevant art will recognize that other steps, configurations and arrangements are useful within the scope of the claimed systems and methods.

A head-end processor selectively arranges a subset of program channels based on a viewing score for application at respective inputs of a multiplexer to create a modified multiplexed transport channel. The viewing score reflects the likelihood that a subscriber will view the program content provided on the program channel. The likelihood could be determined based on surveys or actual viewing statistics collected at a common network node to arrange a channel lineup for a community, at a select tuner for a family or co-located group of viewers and under some conditions, for each specific viewer. By arranging a subset of program channels that are more likely to be viewed into a single multiplexed transport channel, the subscriber experiences a reduced likelihood that a program content selection change will result in the need for the tuner to acquire a carrier from a different multiplexed transport channel. Consequently, the subscriber experiences a reduction in channel change times.

Figure 2:
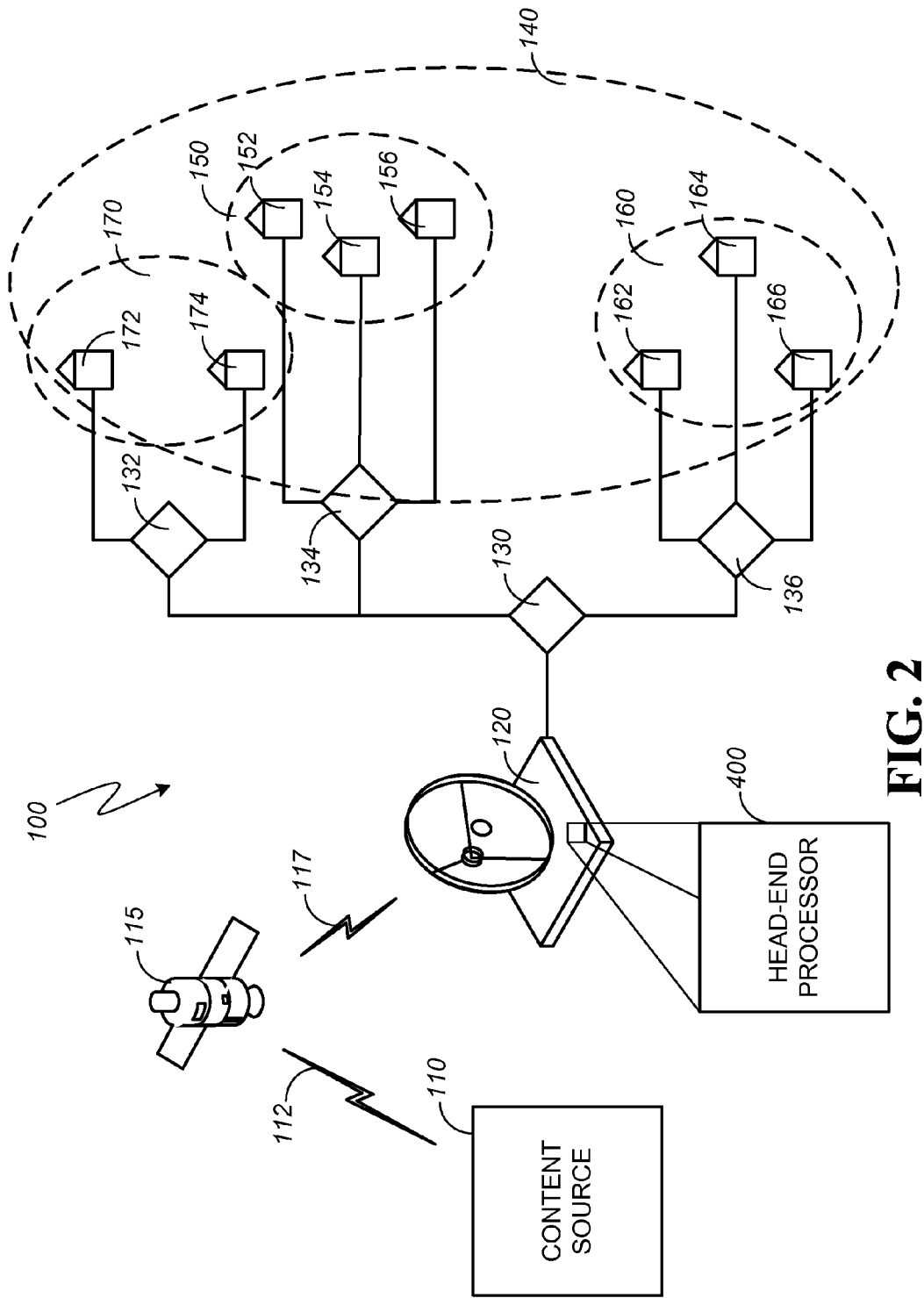
FIG. 2 is a functional block diagram illustrating an embodiment of a distribution network.

Having generally described operation of the systems and methods for optimizing a multiplexed transport channel, various additional embodiments will be described with respect to FIGS. 2-6. FIG. 2 is a functional block diagram illustrating an embodiment of a distribution network. Distribution network 100 includes a content source 110, a satellite 115, a distribution center 120, community 140, sub-community 150, sub-community 160 and sub-community 170. Content source 110 sends one or more channels of programming information via RF uplink 112 to satellite 115. In turn, satellite 115 receives the one or more channels of program information and forwards one or more of the same via RF downlink 117 to distribution center 120. RF uplink 112 and RF downlink 117 are in different portions of the RF spectrum to reduce interference between the uplink and downlink signals.

Distribution center 120 receives the program information via RF downlink 117 and arranges and or buffers the same for delivery to subscribers located in community 140, which is coupled to distribution center 120 via node 130. In the illustrated embodiment, community 140 further includes sub-community 150, which is served by node 134, sub-community 160, which is served by node 136 and sub-community 170, which is served by node 132.

Sub-community 150 includes subscriber premise 152, subscriber premise 154 and subscriber premise 156. Each of subscriber premise 152, subscriber premise 154 and subscriber premise 156 is a single family home or an individual unit in a multiple unit dwelling. Each of subscriber premise 152, subscriber premise 154 and subscriber premise 156 is configured with one or more tuners or set top boxes for selecting an identified program channel from a channel lineup. Furthermore, each subscriber, family of subscribers, grouped units of unrelated subscribers, family member or the individual members of unrelated subscribers may have distinct viewing habits, which include the frequency of selecting any one of the available program channels from the channel lineup provided by distribution center 120.

Sub-community 160 includes subscriber premise 162, subscriber premise 164 and subscriber premise 166. Each of subscriber premise 162, subscriber premise 164 and subscriber premise 166 is a single family home or an individual unit in a multiple unit dwelling. Each of subscriber premise 162, subscriber premise 164 and subscriber premise 166 is configured with one or more tuners or set top boxes for selecting an identified program channel from a channel lineup. As in sub-community 150, each subscriber, family of subscribers, grouped units of unrelated subscribers, family member or the individual members of unrelated subscribers may have distinct viewing habits, which include the frequency of selecting any one of the available program channels from the channel lineup provided by distribution center 120.

Sub-community 170 includes subscriber premise 172 and subscriber premise 174. Each of subscriber premise 172 and subscriber premise 174 is a single family home or an individual unit in a multiple unit dwelling. Each of subscriber premise 172 and subscriber premise 174 configured with one or more tuners or set top boxes for selecting an identified program channel from a channel lineup. As in sub-community 150 and sub-community 160, each subscriber, family of subscribers, grouped units of unrelated subscribers, family member or the individual members of unrelated subscribers may have distinct viewing habits, which include the frequency of selecting any one of the available program channels from the channel lineup provided by distribution center 120.

Regardless of the nature of the individual customer premise, each customer premise can serve a single subscriber, a family of subscribers or multiple unrelated subscribers at each subscriber premise. The sub-community as a whole and each subscriber, family of subscribers, grouped units of unrelated subscribers or the individual members of a family or unit of unrelated subscribers may have distinct viewing habits, which include the frequency of selecting any one of the available program channels from the channel lineup provided by distribution center 120. These viewing habits, whether predicted from past viewing statistics, surveys or other predictive methods or determined from actual tuner selections at any level can be used to develop a measure or score responsive to the likelihood that an identified program channel will be selected or tuned.

Distribution center 120 includes a head-end processor 400, which arranges the various program channels used to deliver the program information into assigned multiplexed transport channels. Head-end processor 400 is configured to arrange the various program channels in an optimal manner based upon a score associated with each of the program channels. In this way, the head-end processor uses a score responsive to predicted or actual viewing habits of a community 140, sub-community 150, sub-community 160, or sub-community 170 to create a modified channel lineup. The modified channel lineup can be generated periodically or aperiodically in response to a channel viewing score predicted or measured for community 140, sub-community 150, sub-community 160, sub-community 170 and in situations where subscribers have a commandable tuner or set top box and a mechanism exists to identify members of a family of subscribers or individual members of an unrelated group, the viewing score may be predicted or determined on an individual viewer basis.

The program information is distributed via a number of multiplexed carrier signals along fiber optic, coaxial cables or other distribution media to the various subscribers of the service via node 130, node 132, node 134 and node 136. Because each of the distribution network nodes is like a head-end from the perspective of subscriber homes, each of node 130, node 132, node 134 and node 136 could be used to communicate a modified channel lineup to tuners or set top boxes located in subscriber premises downstream from distribution center 120. Moreover, head-end processor 400 could be inserted at each of node 130, node 132, node 134 or node 136 to generate an optimized channel lineup for the various subscribers coupled to the nodes.

FIGS. 3A and 3B are schematic diagrams illustrating embodiments of switch arrays inserted in the signal processing paths of FIG. 1. In FIG. 3A, switch array 310 is configured with inputs 302 for receiving program channels 1-X and outputs 304 for forwarding select program channels to select MPEG encoders 1-X. Switch array 310 forwards the program information on a select program channel to an input coupled to a select MPEG encoder in accordance with one or more signals received along command bus 305. The command bus 305 may be further configured to return one or more status conditions responsive to the state of the switch array 310.

In FIG. 3B, switch array 320 is configured with inputs 306 for receiving encoded program channels 1-X from the MPEG encoders and outputs 308 for forwarding select encoded program channels to select multiplexer inputs. Switch array 320 forwards the encoded program information on a select encoded program channel to an input coupled to a select multiplexer input in accordance with one or more signals received along command bus 315. The command bus 315 may be further configured to return one or more status conditions responsive to the state of the switch array 320.

Figure 4:
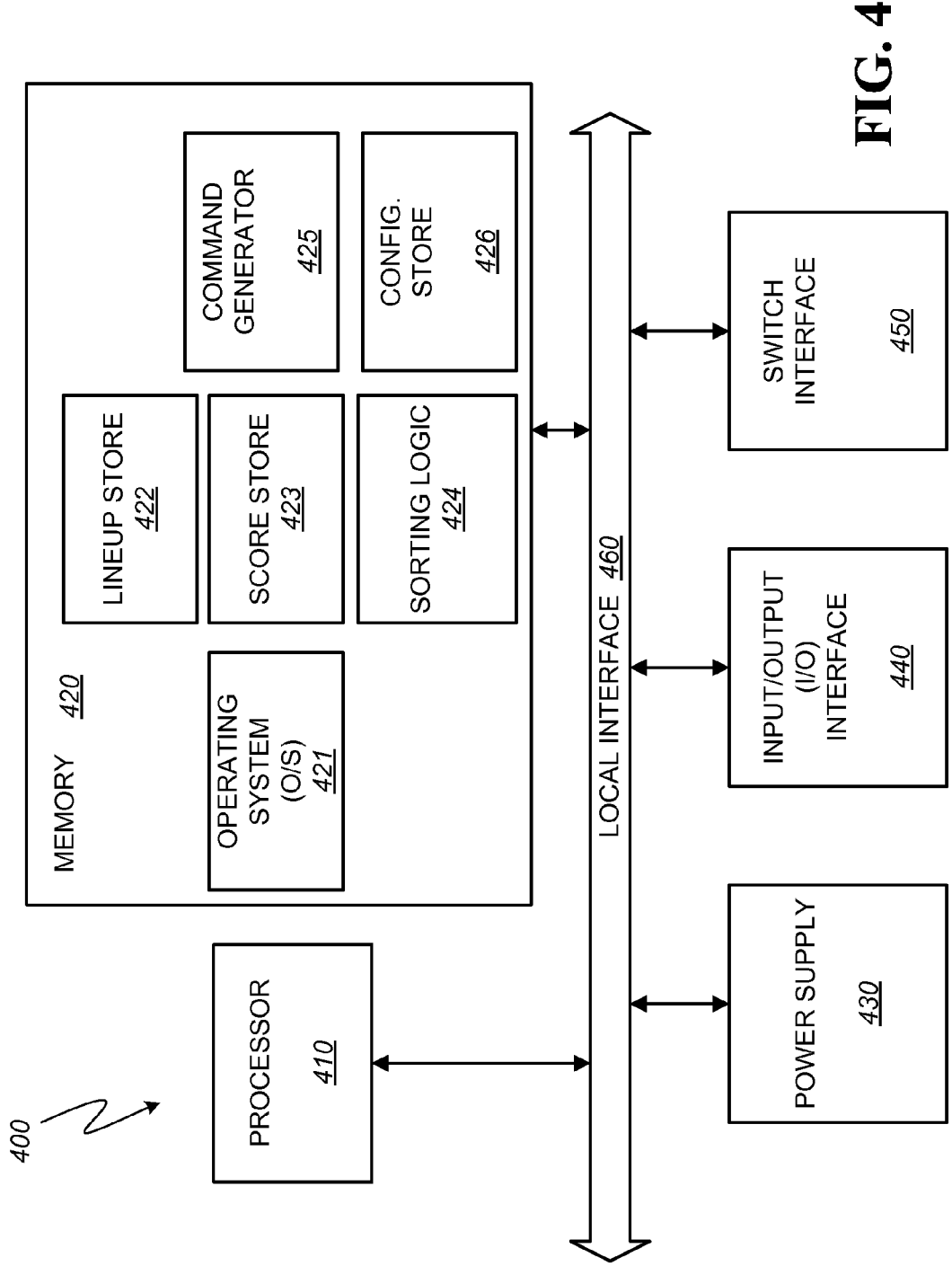
FIG. 4 is a schematic diagram illustrating an embodiment of the head-end processor of FIG. 2.

FIG. 4 is a schematic diagram illustrating an embodiment of the head-end processor 400 of FIG. 2. Generally, in terms of hardware architecture, the head-end processor 400 includes a hardware processor 410, a memory 420, a power supply 430, an input/output or I/O interface 440, a switch interface 450, as well as a local interface 460. Processor 410 is in communication with the memory 420 via the local interface 460. The local interface 460 can be, for example but not limited to, one or more buses or other wired or wireless connections, as is known in the art. The local interface 460 may have additional elements, such as controllers, buffers (caches), drivers, repeaters, and receivers, to enable communications. Further, the local interface 460 may include address, control, power and/or data connections to enable appropriate communications among the aforementioned components.

The processor 410 is a hardware device for executing software, particularly that stored in memory device 420. The processor 410 can be any custom made or commercially available processor configured to execute software instructions.

The memory 420 can include any one or a combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the memory 420 may incorporate electronic, magnetic, optical, and/or other types of storage media. The memory 420 can have a distributed architecture, where various components are situated remote from one another, but still accessible via the processor 410.

The memory 420 includes an operating system 421 that essentially controls the execution of the illustrated functions and perhaps additional functions such as scheduling, input-output control, file and data management, memory management, communication control and related services. One or more programs, each of which comprises an ordered listing of executable instructions for implementing logical functions can be stored in the memory 420. In the illustrated embodiment, memory 420 includes sorting logic 424 and command generator 425.

Sorting logic 424 is a program that identifies the program channels in sequence from the program channel with the highest viewing score to the lowest viewing score. Sorting logic 424 is configured to perform this task on an individual, set top box (i.e., family or unrelated group), sub-community or community level as may be desired. Sorting logic 424 retrieves information from lineup store 422 and score store 423 and applies the logic stored therein under the direction of one or more configuration parameters from configuration store 426.

Command generator 425 is a program that generates commands that direct the switch arrays 320 to apply switch inputs to select switch outputs to enable identified subsets of program channels. That is, the command generator directs the switch arrays 320 to apply a select subset of the available program channels to a particular transport channel.

When implemented as source programs, the sorting logic 424 and command generator 425 are translated via a compiler, assembler, interpreter, or the like, to operate properly in connection with the operating system 421.

Switch interface 450 performs signal conditioning and data format conversions to enable communication through one or more implementations of switch array 310 or switch array 320. Switch interface 450 formats, buffers and sends commands. In addition, switch interface 450 receives and buffers switch array status information from coupled switch arrays.

I/O interface 440 performs signal conditioning and data format conversions to enable communication through a host of devices. These devices may include browsers or other software (not shown) configured to expose configuration parameters, data tables and other information to external devices. Moreover, the devices may include man-machine interfaces such as a keyboard, a display, a printer, etc. Such man-machine interfaces may include touch sensitive displays or the combination of a graphical-user interface and a controllable pointing device such as a mouse to enable an operator to configure or otherwise modify configuration parameters, channel lineups, channel scores, sorting logic 424 or command generator 425.

When instructions and data elements are implemented in software it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where one or more of instructions operable within head-end processor 400 are implemented in hardware, the instructions can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Figure 5:
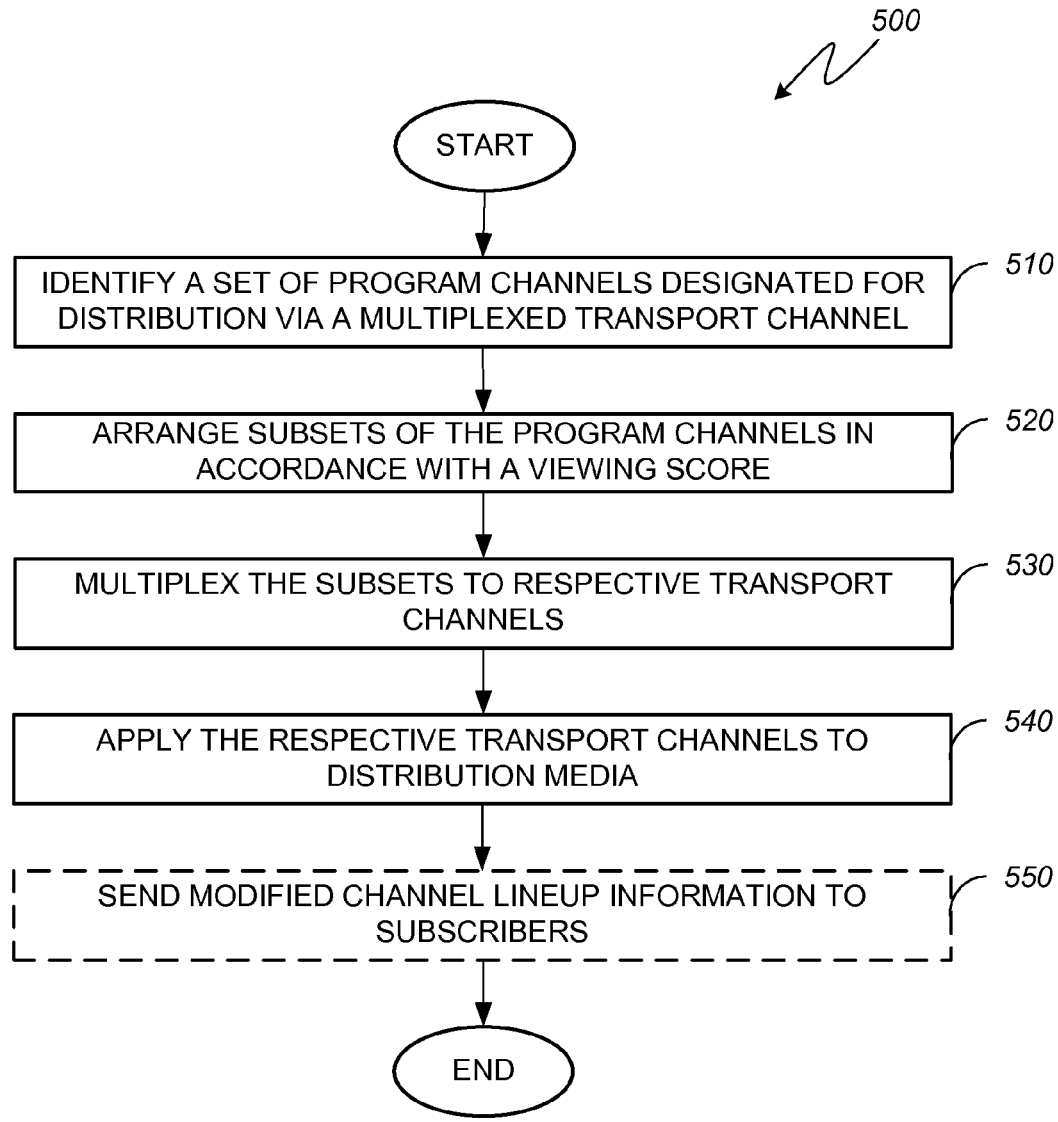
FIG. 5 is a flow diagram illustrating an embodiment of a method for optimizing the arrangement of program channels for delivery via a multiplexed transport channel.

FIG. 5 is a flow diagram illustrating an embodiment of a method for optimizing a multiplexed transport channel. The flow diagram of FIG. 5 shows the architecture, functionality, and operation of a possible implementation via software and or firmware associated with communicatively coupled devices. In this regard, each block represents a module, segment, or portion of code, which comprises one or more executable instructions for implementing the specified function(s).

Method 500 begins with block 510 where a set of program channels designated for distribution via a multiplexed transport channel are identified. Thereafter, in block 520, subsets of the program channels are arranged in accordance with a viewing score. Next, in block 530, the subsets of the program channels are multiplexed to respective transport channels. In block 540, the respective transport channels are applied to distribution media for delivery to subscribers. In alternative block 550, the modified channel lineup information is sent to subscribers.

As described above, the flow diagram of FIG. 5 shows the architecture, functionality and operation of an implementation of an example method for optimizing a multiplexed transport channel. The described functions can be embodied in source code including human-readable statements written in a programming language or machine code that comprises instructions recognizable by a suitable execution system such as a processor in a computer system. The machine code may be converted from the source code, etc. If embodied in hardware, each block may represent a circuit or a number of interconnected circuits to implement the specified logical function(s).

Figure 6:
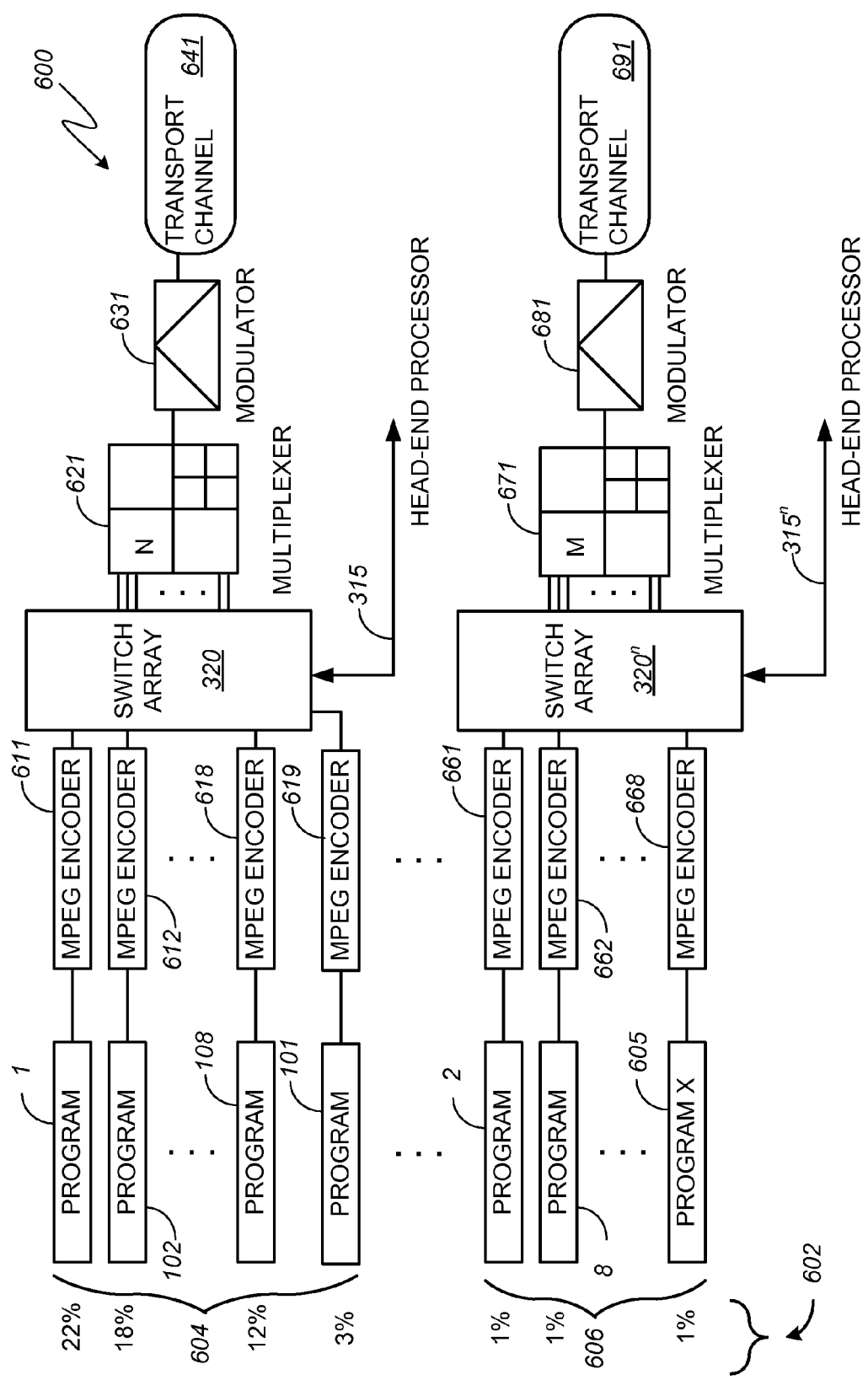
FIG. 6 is a schematic diagram illustrating an embodiment of multiplexed transport channels that are optimized to reduce switching time between frequently viewed program channels.

A system for broadcasting multimedia signals is illustrated in FIG. 6. System 600 receives a set of program channels available in a content package made available to subscribers of a service. The system 600 optimizes a channel lineup to reduce switching time between frequently viewed program channels by placing program channels with a higher likelihood of being tuned or viewed by a subscriber into the same multiplexed transport channel. The system 600 receives program channel 1 through program channel 108 that are inserted into corresponding MPEG encoders. The various outputs of the MPEG encoders are switched via a controllable switch array 320 to generate a first subset 604 of N program channels such that each of the N inputs of multiplexer 621 receive one of the program channels from the first subset 604. Additional outputs of MPEG encoders are also switched via controllable switch array $320n$ to generate a $n^{th}$ subset 606 of M program channels such that each of the M inputs of multiplexer 671 receive one of the M program channels from the $n^{th}$ subset 606.

In the illustrated embodiment, program 1, associated with a viewing score 602 of 22%, is applied to MPEG encoder 611, switch array 320, multiplexer 621 and modulator 631 to provide the first of N program channels in transport channel 641. The viewing score 602 is a measure of the likelihood of a program channel being tuned or viewed by a subscriber during a viewing session. Similarly, program 102, associated with a viewing score of 18%, is applied to MPEG encoder 612, switch array 320, multiplexer 621 and modulator 631 to provide a second of N program channels in transport channel 641. In addition, program 108, having a viewing score of 12%, is applied to MPEG encoder 618, switch array 320, multiplexer 621 and modulator 631 to provide the $N-1^{th}$ program channel in transport channel 641. Lastly, program 101, having a viewing score of 3%, is applied to MPEG encoder 619, switch array 320, multiplexer 621 and modulator 631 to provide the $N^{th}$ of N program channels in transport channel 641.

As further illustrated in FIG. 6, program 2, associated with a viewing score of 1%, is applied to MPEG encoder 661, switching array $320^n$, multiplexer 671 and modulator 681 to provide the first of M program channels in transport channel 691. Similarly, program 8, having a viewing score of 1%, is applied to MPEG encoder 662, switch array 320″, multiplexer 671 and modulator 681 to provide the second of M program channels in transport channel 691. Lastly, program 605 is applied to MPEG encoder 668, switching array 320″, multiplexer 671 and modulator 681 to provide the $M^{th}$ of M program channels in transport channel 691. Transport channel 691 is carried in a different portion of the RF spectrum than that used to carry transport channel 641.

In the illustrated embodiment, switch array 320 under the control of head-end processor 400 via command bus 315, arranges each of the program channels with the highest N viewing scores 602 into subset 604 to create a modified transport channel 641 that includes those program channels that contain the program information with the highest likelihood to be viewed. Additional switch arrays including switch array 320″ are also under the control of head-end processor 400 via respective command busses such as command bus 315″. As further shown in the illustrated embodiment, the program channels are arranged in order from the highest viewing score to the lowest viewing score, with the M channels having the lowest viewing scores being arranged in subset 604 to create modified transport channel 691.

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A content distribution system, comprising:
   a distribution center configured to receive and apply program content on a set of program channels;
   a head-end processor configured to selectively identify subsets of the program channels in accordance with a respective score associated with the plurality of program channels; and
   a multi-channel switch coupled to the distribution center, a first multiplexer and a second multiplexer, the multi-channel switch configured to apply program channels to respective inputs of the first multiplexer and the second multiplexer in response to the head-end processor;
   wherein the head-end processor selectively identifies the subsets of the program channels based on scores responsive to the likelihood that a channel change at a destination will require a tuner to select a program channel that was processed by the other of the first multiplexer and the second multiplexer.

2. The content distribution system of claim 1, wherein the head-end processor selectively identifies the subsets of the program channels based on scores responsive to the likelihood that the program content will be viewed.

3. The content distribution system of claim 1, wherein the head-end processor selectively identifies the subsets of the program channels into a subset of N members, where N is an integer that corresponds to the capacity of the first multiplexer.

4. The content distribution system of claim 1, wherein the head-end processor selectively identifies the subsets of the program channels into a subset of M members, where M is an integer that corresponds to the capacity of the second multiplexer.

5. The content distribution system of claim 1, wherein the head-end processor selectively identifies the subsets of the program channels in response to a statistical analysis of viewing habits.

6. The content distribution system of claim 1, wherein the head-end processor selectively identifies the subsets of the program channels in response to aggregated data for a community.

7. The content distribution system of claim 6, wherein the aggregated data from a community is collected from a community served by a common node in a distribution network.

8. The content distribution system of claim 1, wherein the head-end processor selectively identifies the subsets of the program channels periodically.

9. The content distribution system of claim 1, wherein the head-end processor selectively identifies the subsets of the program channels aperiodically.

\* \* \* \* \*